United States Patent
Das et al.

(10) Patent No.: US 6,847,714 B2
(45) Date of Patent: Jan. 25, 2005

(54) ACCENT-BASED MATCHING OF A COMMUNICANT WITH A CALL-CENTER AGENT

(75) Inventors: Sharmistha Sarkar Das, Broomfield, CO (US); Kenneth R. Hackbarth, Westminster, CO (US); Kenneth B. Jensen, Denver, CO (US); Joylee E. Kohler, Northglenn, CO (US); Valentine C. Matula, Granville, OH (US); Richard A. Windhausen, Boulder, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 10/299,421

(22) Filed: Nov. 19, 2002

(65) Prior Publication Data

US 2004/0096050 A1 May 20, 2004

(51) Int. Cl.[7] ............................................ H04M 7/00
(52) U.S. Cl. .............................. 379/265.12; 379/221.01
(58) Field of Search ........................ 379/265.01, 265.12, 379/266.01, 219, 221.01

(56) References Cited

U.S. PATENT DOCUMENTS 5,828,731 A * 10/1998 Szlam et al. ................ 379/265
5,963,635 A * 10/1999 Szlam et al. ................ 379/309
6,333,979 B1 * 12/2001 Bondi et al. ........... 379/265.01

OTHER PUBLICATIONS

L.F. Lamel and J.L Gauvain, *Language Identification Using Phone–based Acoustic Likelihoods*, ICASSP–94, 4 pages.

John H.L. Hansen and Levent M. Arslan, *Foreign Accent Classification Using Source Generator Based Prosodic Features*, IEEE Proc. ICASSP, vol. 1, pp. 836–839, Detroit USA (May 1995).

Levent M. Arslan and John H.L. Hansen, *Language Accent Classification in American English*, Robust Speech Processing Laboratory, Duke University Department of Electrical Engineering, Durham, NC, Technical Report RSPL–96–7.

Levent M. Arslan, *Foreign Accent Classification in American English*, Department of Electrical Computer Engineering, Duke University, thesis, pp. 1–200 (1996).

* cited by examiner

Primary Examiner—Creighton Smith
(74) Attorney, Agent, or Firm—David Volejnicek

(57) ABSTRACT

The accent of a party to a call is determined from a speech sample of the party and the call is sent for servicing to a call-center agent who has skill in the determined accent, and preferably to an agent who speaks both the determined language and the language of the accent.

20 Claims, 5 Drawing Sheets

ACCENT-BASED MATCHING OF A COMMUNICANT WITH A CALL-CENTER AGENT

TECHNICAL FIELD

This invention relates to call centers.

BACKGROUND OF THE INVENTION

A call center distributes calls for handling among call-center agents. Modern call centers typically perform skills-based matching between calls and agents. This involves having a record of individual agents' skills, determining individual call's needs, and then matching agents with calls based on which agent's skills best match a call's needs.

In multi-ethnic nations—the United States of America being an example—many people have a language other than the national language as their native language. They often feel more comfortable with their native language, and would prefer to use their native language to conduct business. Furthermore, almost all persons who have a native language different from the national language have an accent in the national language, which often makes it more difficult for them to be understood by call-center agents. Thus, persons with accents often require more time and focus on the part of the agents to handle their calls, and there may be discomfort in the quality of the interaction.

The problem exists in reverse as well: It is becoming common to implement call centers that serve a nation's populace in foreign countries, often for cost reasons. In this situation, it is the agent, and not the calling or called party (referred to herein as the communicant), that has a native language different from the national language and therefore has an accent in the national language, with all of the problems associated therewith. Moreover, even if the two nations, or even different regions of the same nation, have a common language, their manner of speaking it (accent) maybe so different as to cause the same problems. For example, many nations of the British Commonwealth have English as their national language, but speak it with widely different accents.

Interactive voice response (IVR) systems often provide services in multiple languages, and ask a caller to select the desired language from a menu of options. This requires many multi-lingual agents even when the customer is multi-lingual, because the IVR system can only detect one response, and thus cannot indicate that the customer is multi-lingual. If the desired language is not supported by the IVR system, the caller must select his or her secondary language. In any case, these calls are matched with agents without regard for accent.

SUMMARY OF THE INVENTION

This invention is directed to solving these and other problems and disadvantages of the prior art. Generally according to the invention, the accent of a party to a call (i.e., a communicant's accent) is automatically determined (i.e., identified) from a speech sample of the party, and based on the accent the call is sent for servicing to a call-center agent who is skilled in the determined accent (e.g., who understands that accent, speaks with that same accent, or is best able to handle communicants with that accent), and who preferably has the language skill in the communicant's native language to handle the call in that native language if desired by the communicant.

The invention advantageously sends a call for servicing to an agent who can best deal with the communicant's accent. Illustratively, the invention allows communicants to conduct business with a call center in either their first (native) or second language. It requires fewer language-specific agents. It allows call centers to hire more agents with heavy accents, either locally or abroad, and have them serve only callers with similar accents. Fewer complaints are likely to be received from communicants about not being able to understand or to be understood by agents. With the call center being viewed by the communicants as "being like them", more business is likely to be conducted satisfactorily.

While the invention has been characterized in terms of method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

BRIEF DESCRIPTION OF THE DRAWING

These and other features and advantages of the invention will become more apparent from the following description of an illustrative embodiment of the invention considered together with the drawing wherein.

DETAILED DESCRIPTION

Figure 1:
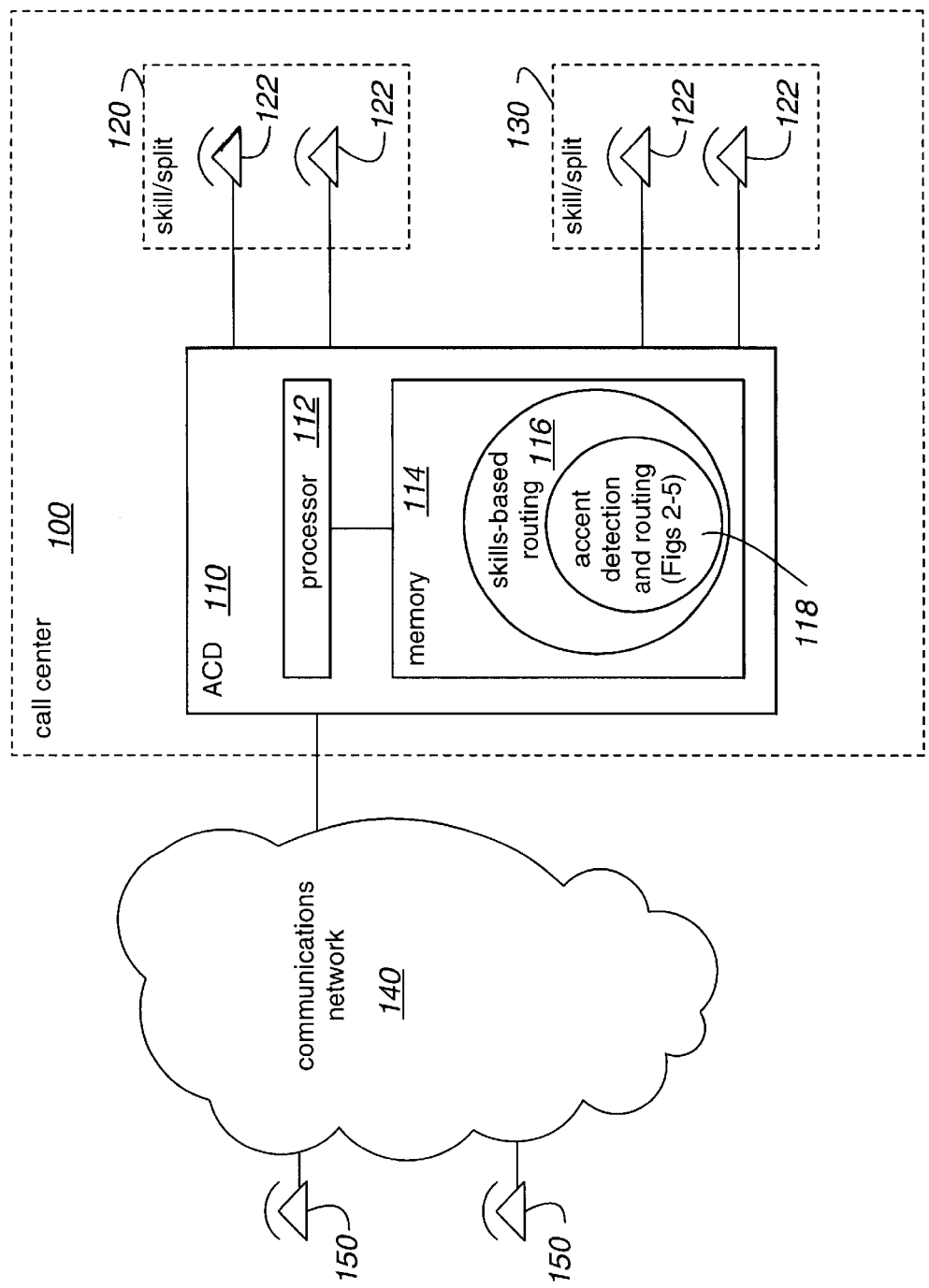
FIG. 1 is a block diagram of a call center that includes an illustrative embodiment of the invention.

FIG. 1 shows a call center 100 that is connected by a communications network 140 to communications terminals of calling or called parties, referred to herein as communicants 150. Call center 100 comprises an automatic call distribution (ACD) system 110 that distributes calls for handling among communication terminals of agents 122 and 132 of a plurality of skills or splits 120 and 130, respectively. ACD system 110 is a stored-program-controlled machine comprising a memory 114 or other suitable computer-readable storage medium for storing control programs and data, and a processor 112 for executing programs and storing and using data in and from memory 114 to control the operation of ACD 110. The control programs stored in memory 114 include a skills-based routing program 116. As described so far, call center 100 is conventional.

According to the invention, skills-based routing 116 is supplemented with accent detection and routing 118. Accent detection and routing 118 performs the following functions:

When a call—either inbound or outbound—connects a communicant 150 to ACD system 110, a voice sample of the communicant is collected. This is done, for example, by prompting communicant 150 to speak by asking communicant 150 to state their problem or their account number. The collected voice sample is then analyzed to determine (classify) the communicant's accent, and illustratively the degree of accent and even the language that he or she is speaking. The analysis is illustratively effected by comparing the collected voice sample to stored known speech samples. Illustrative techniques for accent or language identification are disclosed in L. M. Arslan, *Foreign Accent Classification in American English*, Department of Electrical and Computer Engineering Graduate School thesis, Duke University, Durham, N.C., USA (1996), L. M. Arslan et al., "Language Accent Classification in American English", Duke University, Durham, N.C., USA, Technical Report RSPL-96-7, *Speech Communication*, Vol. 18(4), pp. 353–367 (June/July 1996), J. H. L. Hansen et al., "Foreign Accent Classification Using Source Generator Based Prosodic Features", *IEEE International Conference on Acoustics, Speech, and Signal Processing*, 1995. ICASSP-95., Vol. 1, pp. 836–839, Detroit, Mich., USA (May 1995), and L. F. Lamel et al., "Language Identification Using Phone-based Acoustic Likelihoods", *IEEE International Conference on Acoustics, Speech, and Signal Processing*, 1994. ICASSP-94., Vol. 1, pp. I/293–I/296, Adelaide, SA, AU (19–22 Apr. 1994).

When the accent or the language and accent is determined, call-distribution algorithms use a set of communicant attributes and agent skills that include language and accent to best match the communicant's call with an agent 122 or 132 for handling the call. The best match may be an agent who understands the accent, speaks with that accent, or merely is best able to handle communicants with that accent on account of, for example, having studied or lived in that culture. If an exact match cannot be made, care is taken to not match a communicant 150 with a strong accent of one type to an agent 122 or 132 with a strong accent of a totally different type. When the call is delivered to the selected agent 122 or 132, but prior to bridging the voice paths between communicant 150 and agent 122 or 132, the speech that communicant 150 initially provided to accent detection and routing 118 can be played privately to the selected agent 122 or 132 so that information initially provided by communicant 150 is not lost.

When the voice path between the communicant 150 and the selected agent 122 or 132 is connected, agent 122 or 132 can converse with communicant 150 in the primary (e.g. national) language and have the skills to understand the communicant's accent, and perhaps even speak to the communicant in the same accent. In addition, the agent or communicant may suggest carrying out the call in the secondary (e.g. the communicant's native) language.

Figure 2:
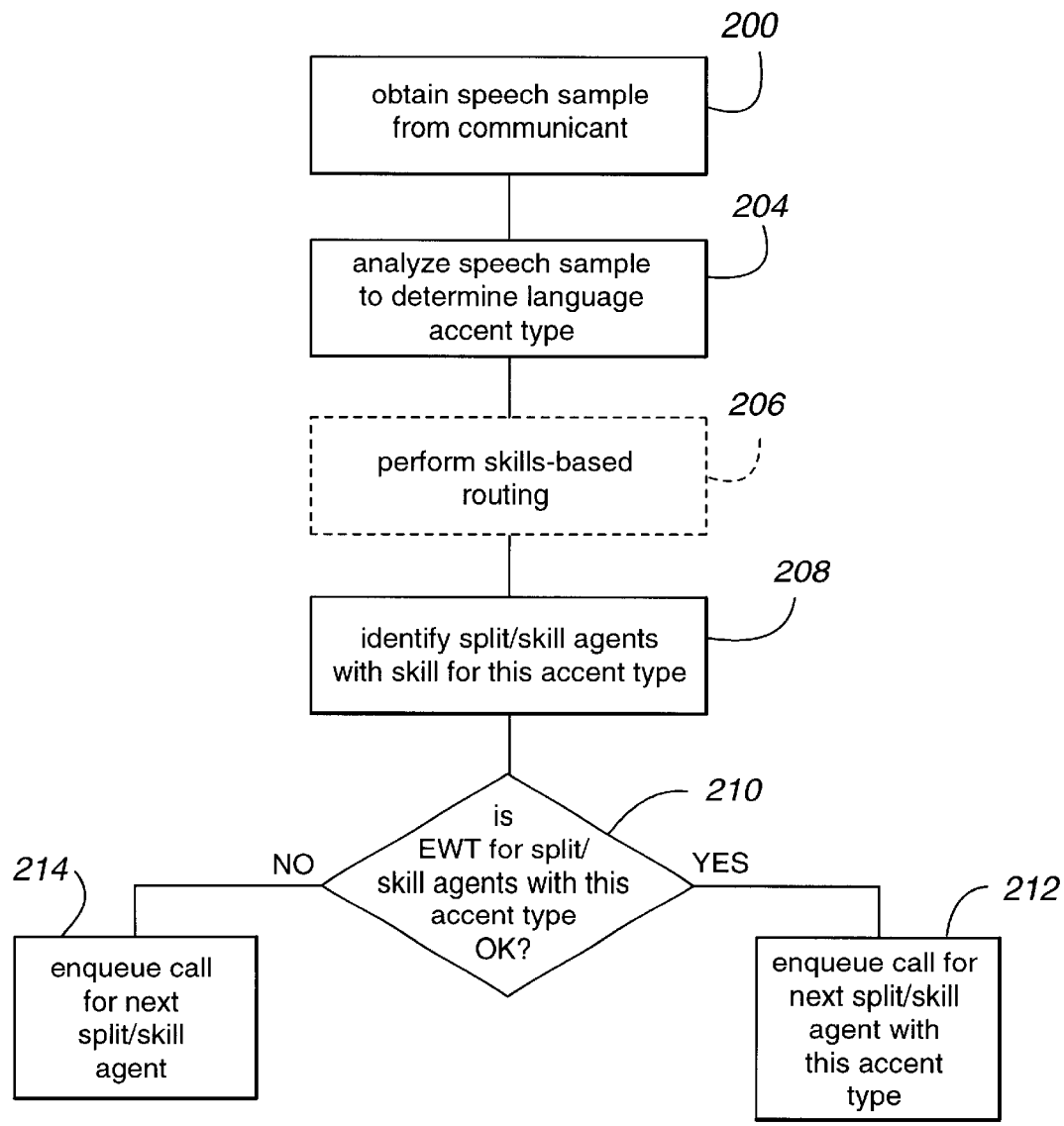
FIGS. 2–5 are flow diagrams of four embodiments of functionality of the accent detection and routing function of the call center of FIG. 1.

FIGS. 2–5 show various illustrative examples of functionality implemented by accent detection and routing 118. In FIG. 2, accent detection and routing 118 identifies a communicant's accent in only the primary language and enqueues the call accordingly. A speech sample is obtained from a communicant 150 who becomes connected to ACD 110, at step 200, illustratively by prompting communicant 150 to state their problem or their account number. The speech sample is analyzed to determine the accent type, at step 204. For example, the primary language may be English, and communicant 150 may be determined to speak English with a Spanish accent type. In the meantime, conventional skills-based routing is performed for the call by skills-based routing 116, at step 206. Agents from the skill or split 120 or 130 to which the call has been assigned for handling at step 206 and who have as one of their indicated skills an accent of the determined type are identified, at step 208. The estimated wait times (EWTs) for those identified agents or for their skill/split are conventionally determined, and a decision is made regarding whether the determined EWT for agents who could be expected to handle the call is acceptable, i.e., does not exceed a predetermined threshold amount of time, at step 210. If the EWT is acceptable, the call is enqueued in a call queue for agents with the determined accent type, at step 212. If the EWT is not acceptable, the call is enqueued in a general call queue for the split or skill 120 or 130 that was selected at step 206, at step 214.

Figure 3:
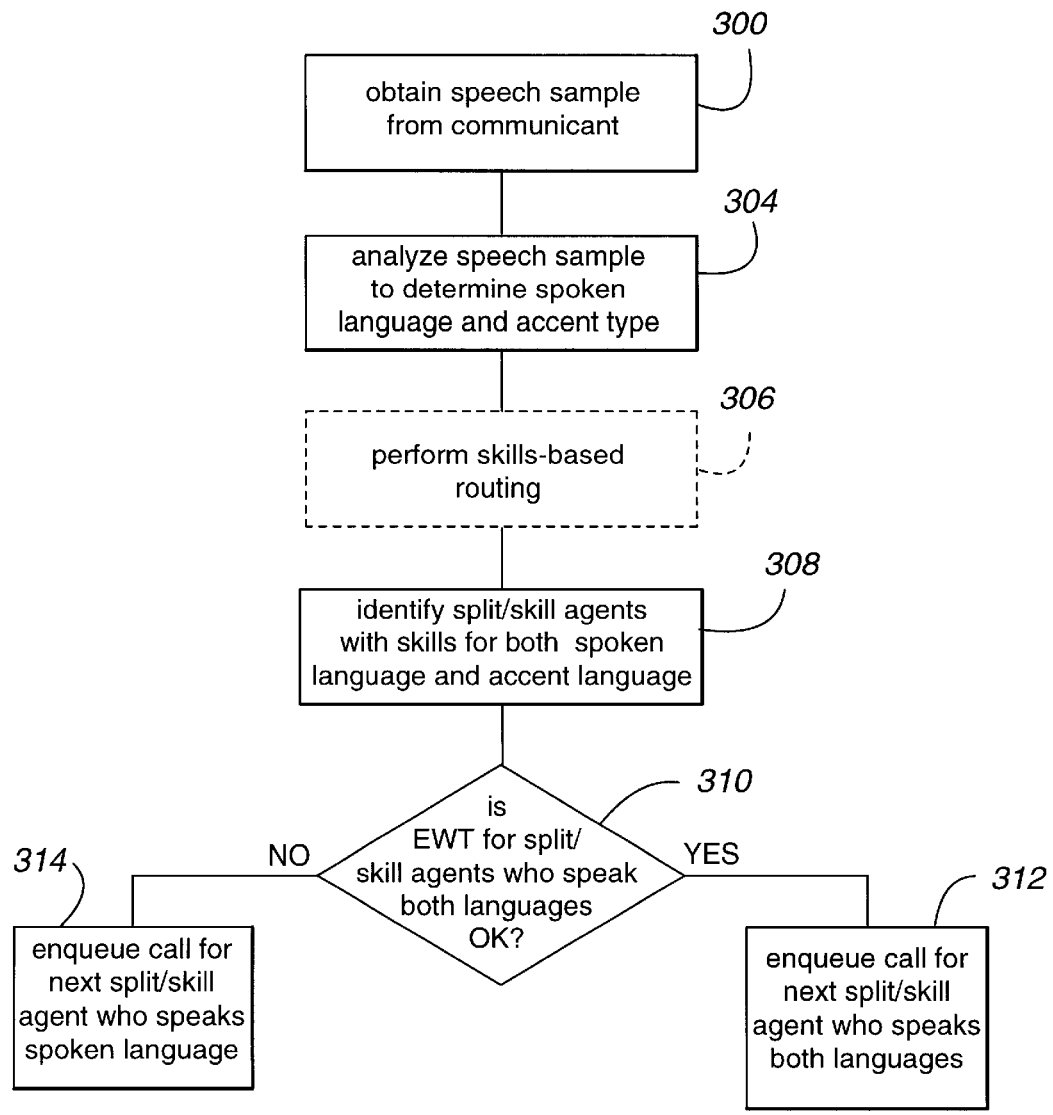

In FIG. 3, accent detection and routing 118 identifies both the spoken language and the accent and enqueues the call accordingly with rough granularity. A speech sample is obtained from a communicant 150 who becomes connected to ACD 110, at step 300, and the speech sample is analyzed to determine both the language spoken by communicant 150 and the language accent type with which communicant 150 speaks that language, at step 304. In the meantime, conventional skills-based routing is performed for the call by skills-based routing 116, at step 306. Agents from the skill or split 120 or 130 to which the call has been assigned for handling at step 306 and who speak both languages that were determined at step 304 are identified, at step 308. The EWT for these agents is determined and a decision is made regarding whether the EWT is acceptable, at step 310. If the EWT is acceptable, the call is enqueued in a call queue for agents with skills in both the spoken and accent type languages, at step 212. If the EWT is not acceptable, the call is enqueued in a call queue for agents who have skill in the spoken language, at step 314.

Figure 4:
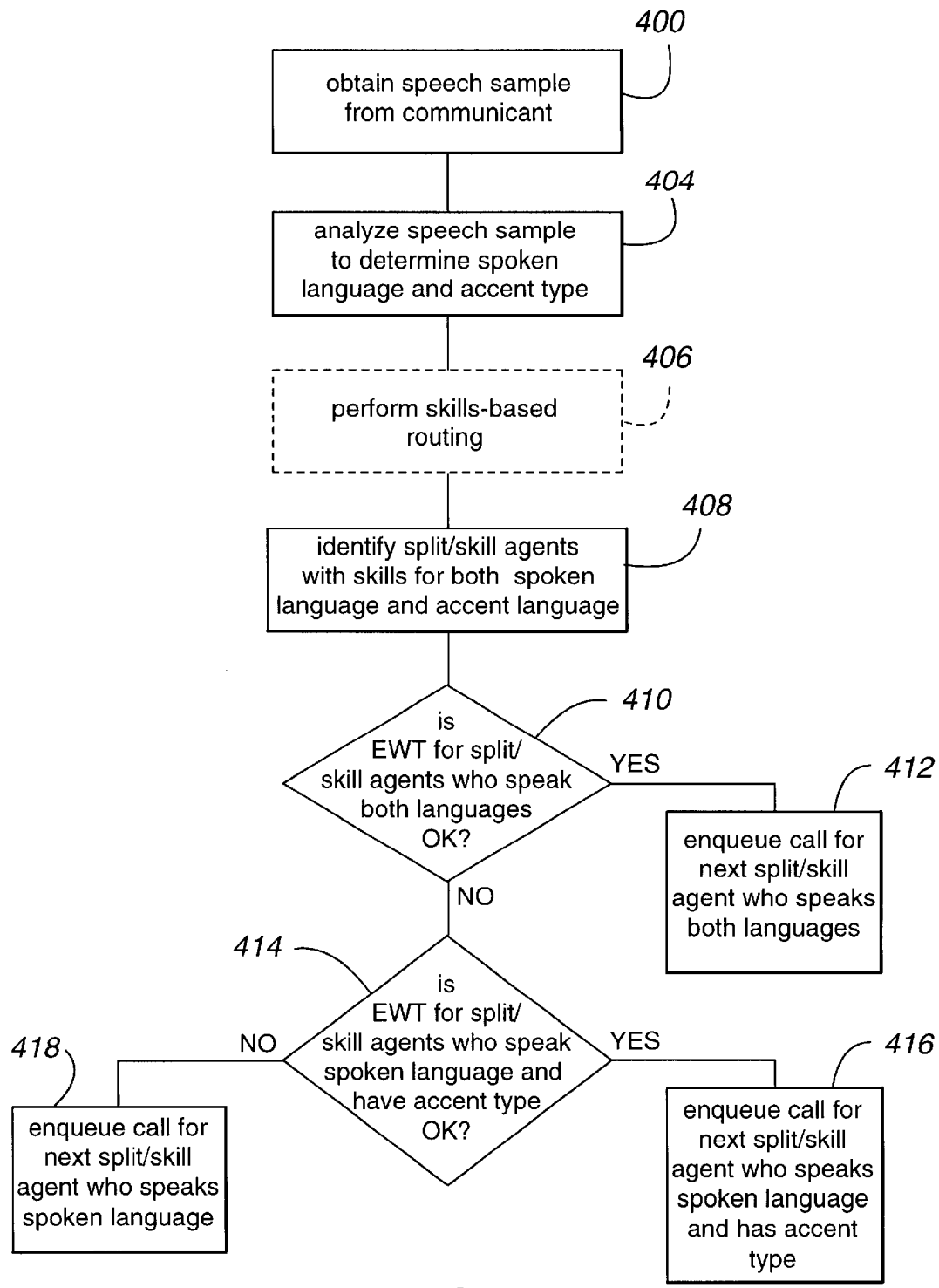

In FIG. 4, accent detection and routing 118 identifies both the spoken language and the accent type and enqueues the call accordingly with fine granularity. Steps 400–412 of FIG. 4 are the same as steps 300–312, respectively, FIG. 3. If the bilingual handling agents' EWT that was determined at step 412 is not acceptable, a decision is made regarding whether the EWT of those agents who speaks the spoken language and have skill in the accent type and who could be expected to handle this call is acceptable, at step 414. If the EWT is acceptable, the call is enqueued in a call queue for agents who speak the spoken language and have skill in the accent type, at step 416. If the EWT is not acceptable, the call is enqueued in a call queue for agents who speak the spoken language, at step 418.

Figure 5:
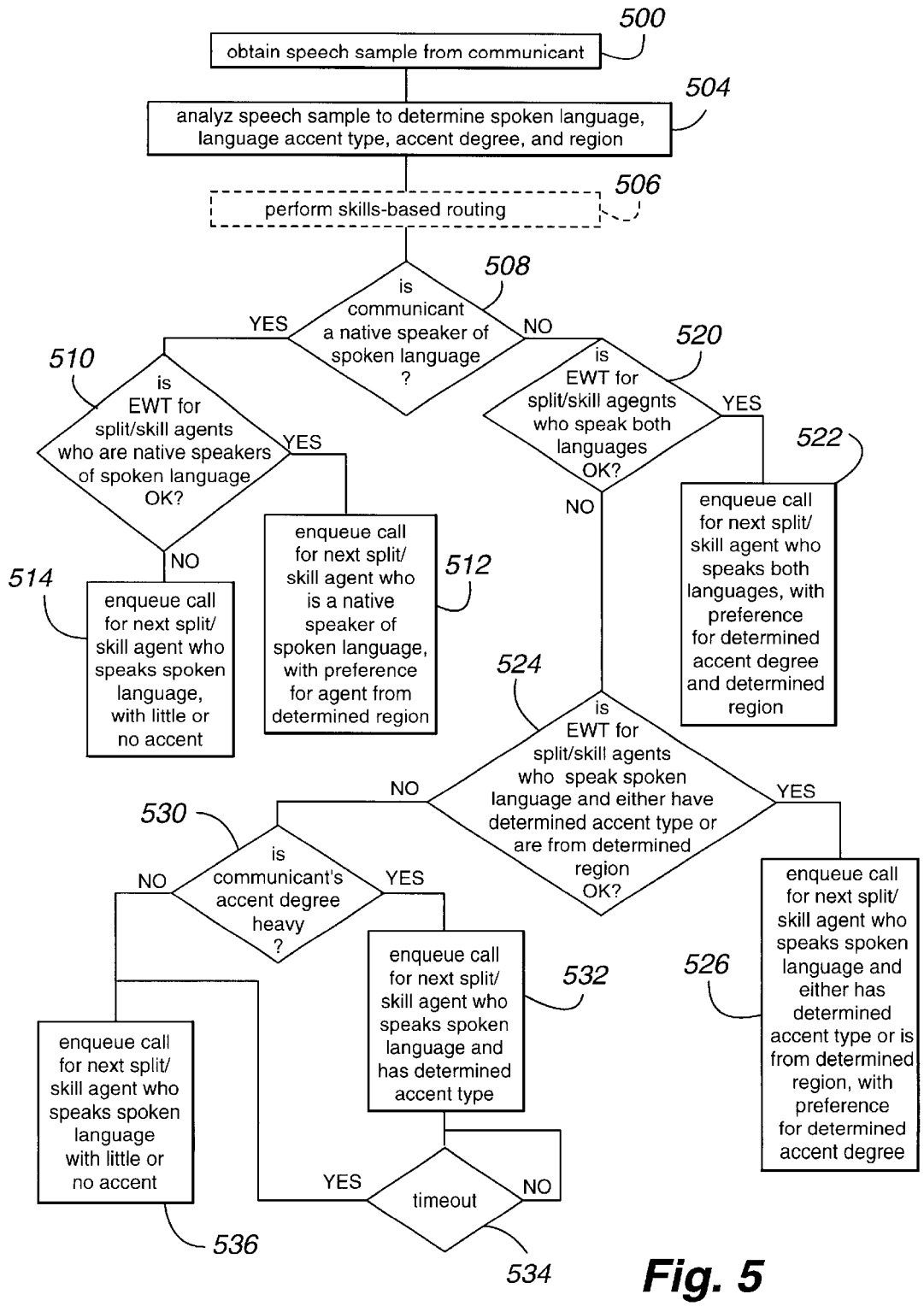

In FIG. 5, accent detection and routing 118 identifies the spoken language, accent type, accent degree, and region of the communicant, and enqueues the call accordingly. A speech sample is obtained from a communicant 150 who becomes connected to ACD 110, at step 500, and the speech sample is analyzed to determine the language spoken by communicant 150, the accent type with which communicant 150 speaks that language, the degree of the communicant's accent (i.e., is it a heavy or a light accent), and the communicant's region (e.g., regional dialect), at step 504. For example, the region may be used in German to distinguish between Hochdeutch, Plattdeutch, Bavarian German, and Austrian German. In the meantime, conventional skills-based routing is performed for the call by skills-based routing 116, step 506.

Based on results of step 504, a determination is made of whether communicant 150 is a native speaker of the spoken language, at step 508, i.e., whether the accent type corresponds to the spoken language. If communicant 150 is a native speaker, agents from the skill or split 120 or 130 to which the call has been assigned for handling at step 506 and who are identified by their skills as native speakers of the spoken language are identified, the EWT for these agents is determined, and a decision is made regarding whether the EWT is acceptable, at step 508. If the prospective handling agents' EWT is acceptable, the call is enqueued for the next split/skill agent who is a native speaker of the spoken language, from the determined region, at step 512. If the prospective handling agents' EWT is not acceptable, the call is enqueued for any (i.e., the next) split/skill agent who speaks the spoken language with little or no accent, at step 514.

Returning to step 508, if it is determined there that communicant 150 is not a native speaker of the spoken language, agents from the skill/split 120 or 130 to which the call has been assigned for handling at step 506 and who speak both the spoken and the accent-type languages are identified, the EWT for these agents is determined, and a decision is made regarding whether the EWT is acceptable, at step 520. If the prospective handling agents' EWT is acceptable, the call is enqueued for the next split/skill agent who speaks both the spoken and the accent-type languages, and a preference of the call for an agent with the determined degree of accent and from the determined region is noted, at step 522. The regional preference is indicated via a desired-skill indication, as opposed to a required-skill indication. If the prospective handling agents' EWT is not acceptable, an attempt is made to match the call with an available agent who has the closest degree of accent to the communicant. Agents from the skill/split 120 or 130 to which the call has been assigned for handling at step 506 and who have among their skills the spoken language and also either have the accent type or are from the region that was that determined at step 504 are identified, the EWT for these agents is determined, and a decision is made regarding whether the EWT is acceptable, at step 524. If the prospective handling agents' EWT is acceptable, the call is enqueued for the next split/skill agent who speaks the determined spoken language and either has the determined accent type or is from the determined region, and a preference of the call for the determined degree of accent is noted, at step 526.

If the prospective handling agents' EWT is not acceptable, the communicant's determined accent degree is checked, at step 530. If the determined accent degree is not heavy, the call is enqueued for the next skill/split agent who speaks the spoken language with little or no accent, at step 536. If the determined accent degree is heavy, the call is enqueued for the next skill/split agent who speaks the spoken language and has the determined accent type, at step 532. But if the call is not assigned to an agent for handling within a predetermined period of time after being enqueued at step 532 (after a timeout), as determined at step 534, the call is requeued for the next skill/split agent who speaks the spoken language with little or no accent, at step 536.

Of course, various changes and modifications to the illustrative embodiments described above will be apparent to those skilled in the art. For example, EWT thresholds may be set automatically, and agents may be assigned as backup or reserve agents to support situations where the wait time is too high. On outgoing calls, if the called party's accent is known before the call is established (for example, by being looked up in a database entry corresponding to the party) or can be determined from their answering machine answering the call, leaving a voice message in the called party's accent may increase the probability of a callback from the called party. In reverse-911 applications, a voice sample of the called party can be collected and an emergency message may be played to that party in the appropriate accent or language. If no accent can be determined for the called party, an assumption may be made about accent based on the called party's address. Also, a speech impediment or some other speech pattern may constitute an accent for purposes of this invention. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:

obtaining a speech sample from a party to a call;

analyzing the speech sample to determine an accent of the party; and sending the call for servicing to a call-center agent who is skilled in the determined accent.

2. The method of claim 1 wherein:

sending comprises enqueuing the call for servicing by an agent who is skilled in the determined accent.

3. The method of claim 1 wherein:

sending comprises estimating a wait time of the call for an agent who is skilled in the determined accent;

if the estimated wait time is acceptable, enqueuing the call for servicing by an agent who is skilled in the determined accent; and if the estimated wait time is not acceptable, enqueuing the call for servicing by any agent who is capable of servicing the call.

4. The method of claim 1 wherein:

the agent is an automated application.

5. A method comprising:

prompting a party to a call via the call to speak on the call;

receiving the party's speech via the call;

comparing the received speech with stored speech samples to determine an accent of the party; and sending the call for servicing to a call-center agent who is skilled in the determined accent.

6. A method comprising:

determining both a language spoken by a party to a call and an accent with which the party speaks the language;

estimating a wait time of the call for an agent who is skilled in both the spoken language and a language of the determined accent;

if the estimated wait time is acceptable, enqueuing the call for servicing by an agent who is skilled in both said languages; and if the estimated wait time is not acceptable, enqueuing the call for servicing by any agent who is skilled in the spoken language.

7. A method comprising:

determining both a language spoken by a party to a call and an accent with which the party speaks the language;

estimating a first wait time of the call for an agent who is skilled in both the spoken language and a language of the determined accent;

if the first wait time is acceptable, enqueuing the call for servicing by an agent who is skilled in both said languages;

if the first wait time is unacceptable, estimating a second wait time of the call for an agent who is skilled in both the spoken language and the determined accent;

if the second wait time is acceptable, enqueuing the call for servicing by an agent who is skilled in both the spoken language and the determined accent; and if the second wait time is unacceptable, enqueuing the call for servicing by any agent who is skilled in the spoken language.

8. A method comprising:

determining a language spoken by a party to a call, an accent of the party and a degree of the accent with which the party speaks the language, and a geographical region of the party;

determining whether the party is a native speaker of the spoken language;

if the party is a native speaker of the spoken language, estimating a first wait time of the call for an agent who is a native speaker of the spoken language;

if the first wait time is acceptable, enqueuing the call for servicing by an agent who is a native speaker of the spoken language;

if the first wait time is not acceptable, enqueuing the call for servicing by any agent who speaks the spoken language with a low degree of accent;

if the party is not a native speaker of the spoken language, estimating a second wait time of the call for an agent who is skilled in both the spoken language and a language of the accent;

if the second wait time is acceptable, enqueuing the call for servicing by an agent who is skilled in both languages and with a preference for an agent who has the determined degree of accent and corresponds to the determined geographical region;

if the second wait time is not acceptable, estimating a third wait time of the call for an agent who is skilled in the spoken language and either is skilled in the determined accent or corresponds to the determined geographical region;

if the third wait time is acceptable, enqueuing the call for servicing by an agent who is skilled in the spoken language and either is skilled in the determined accent or corresponds to the determined geographical region and with a preference for an agent who has the determined degree of accent;

if the third wait time is not acceptable and the determined degree of accent is low, enqueuing the call for servicing by an agent who speaks the spoken language with a low degree of accent; and if the third wait time is not acceptable and the determined degree of accent is high, enqueuing the call for servicing by an agent who speaks the spoken language with the determined accent.

9. The method of claim 8 further comprising:

if the call is enqueued for servicing by an agent who speaks the spoken language with the determined accent and the call is not serviced within an acceptable period of time, requeuing the call for servicing by any agent who speaks the spoken language with a low degree of accent.

10. An apparatus that performs the method of one of claims 1, 5, 2, 3, 6, 7, 8, 9 and 4.

11. A computer-readable medium containing instructions which, when executed in a computer, cause the computer to perform the method of one of claims 1, 5, 2, 3, 6, 7, 8, 9 and 4.

12. An apparatus comprising:

means for obtaining a speech sample from a party to a call;

means for analyzing the speech sample to determine an accent of the party; and means, responsive to the analyzing means, for causing the call to be sent for servicing to a call-center agent who is skilled in the determined accent.

13. The apparatus of claim 12 wherein:

the agent is an automated application.

14. The apparatus of claim 12 wherein:

the means for causing comprise means for enqueuing the call for servicing by an agent who is skilled in the determined accent.

15. The apparatus of claim 12 wherein:

the means for causing comprise means for estimating a wait time of the call for an agent who is skilled in the determined accent; and means responsive to the estimated wait time being acceptable, for enqueuing the call for servicing by an agent who is skilled in the determined accent, and responsive to the estimated wait time not being acceptable, for enqueuing the call for servicing by any agent who is capable of servicing the call.

16. An apparatus comprising:

means for prompting a party to a call via the call to speak on the call;

means responsive to receiving the party's speech via the call, for comparing the received speech with stored speech samples to determine an accent of the party; and means for causing the call to be sent for servicing to a call-center agent who is skilled in the determined accent.

17. An apparatus comprising:

means for determining both a language spoken by a party to a call and an accent with which the party speaks the language;

means for estimating a wait time of the call for an agent who is skilled in both the spoken language and a language of the determined accent; and means responsive to the estimated wait time being acceptable, for enqueuing the call for servicing by an agent who is skilled in both said languages, and responsive to the estimated wait time not being acceptable, for enqueuing the call for servicing by any agent who is skilled in the spoken language.

18. An apparatus comprising:

means for determining both a language spoken by a party to a call and an accent with which the party speaks the language;

means for estimating a first wait time of the call for an agent who is skilled in both the spoken language and a language of the determined accent, and for estimating a second wait time of the call for an agent who is skilled in both the spoken language and the determined accent;

means responsive to the first wait time being acceptable, for enqueuing the call for servicing by an agent who is skilled in both said languages, responsive to the first wait time being unacceptable and the second wait time being acceptable, for enqueuing the call for servicing by an agent who is skilled in both the spoken language and the determined accent, and responsive to both the first wait time and the second wait time being unacceptable, for enqueuing the call for servicing by any agent who is skilled in the spoken language.

19. An apparatus comprising:

means for determining a language spoken by a party to a call, an accent of the party and a degree of the accent with which the party speaks the language, and a geographical region of the party, and whether the party is a native speaker of the spoken language;

means for estimating a first wait time of the call for an agent who is a native speaker of the spoken language, for estimating a second wait time of the call for an agent who is skilled in both the spoken language and a language of the accent, and for estimating a third wait time of the call for an agent who is skilled in the spoken language and either is skilled in the determined accent or corresponds to the determined geographical region;

means responsive to the party being a native speaker of the spoken language and the first wait time being acceptable, for enqueuing the call for servicing by an agent who is a native speaker of the spoken language;

means responsive to the party being a native speaker of the spoken language and the first wait time not being acceptable, for enqueuing the call for servicing by any agent who speaks the spoken language with a low degree of accent;

means responsive to the party not being a native speaker of the spoken language and the second wait time being acceptable, for enqueuing the call for servicing by an agent who is skilled in both languages and with a preference for an agent who has the determined degree of accent and corresponds to the determined geographical region;

means responsive to the party not being a native speaker of the spoken language, the second wait time not being acceptable, and the third wait time being acceptable, for enqueuing the call for servicing by an agent who is skilled in the spoken language and either is skilled in the determined accent or corresponds to the determined geographical region and with a preference for an agent who has the determined degree of accent;

means responsive to the party not being a native speaker of the spoken language, the second wait time and the third wait time not being acceptable, and the determined degree of accent being low, for enqueuing the call for servicing by an agent who speaks the spoken language with a low degree of accent; and means responsive to the party not being a native speaker of the spoken language, the second wait time and the third wait time not being acceptable, and the determined degree of accent being high, for enqueuing the call for servicing by an agent who speaks the spoken language with the determined accent.

20. The apparatus of claim 19 further comprising:

means responsive to the call being enqueued for servicing by an agent who speaks the spoken language with the determined accent and the call not being serviced within an acceptable period of time, for requeuing the call for servicing by any agent who speaks the spoken language with a low degree of accent.

* * * * *